United States Patent
Tien

(10) Patent No.: US 7,669,820 B2
(45) Date of Patent: Mar. 2, 2010

(54) SUPPORTING DEVICE AND ELECTRONIC APPARATUS USING THE SAME

(75) Inventor: Chih-Wei Tien, Chiayi County (TW)

(73) Assignee: Qisda Corporation, Taoyuan County (TW)

( * ) Notice: Subject to any disclaimer, the term of this patent is extended or adjusted under 35 U.S.C. 154(b) by 207 days.

(21) Appl. No.: 11/822,487

(22) Filed: Jul. 6, 2007

(65) Prior Publication Data
US 2009/0008520 A1 Jan. 8, 2009

(51) Int. Cl.
*A47B 96/00* (2006.01)
(52) U.S. Cl. .......... 248/222.13; 292/150; 292/169; 292/137; 248/222.11
(58) Field of Classification Search ......... 248/222.11, 248/222.51, 222.12, 220.21, 292/13, 323, 248/917, 222.13, 225.21, 221.11, 220.22; 292/137, 145, 146, 150, 163, 169, 175, DIG. 37
See application file for complete search history.

(56) References Cited

U.S. PATENT DOCUMENTS

| | | | | |
|---|---|---|---|---|
| 5,722,705 A | * | 3/1998 | Deguchi | 292/87 |
| 5,769,369 A | * | 6/1998 | Meinel | 248/176.1 |
| 6,029,940 A | * | 2/2000 | Klein | 248/346.04 |
| 7,317,613 B2 | * | 1/2008 | Quijano et al. | 361/679.41 |
| 7,441,739 B2 | * | 10/2008 | Huang | 248/292.14 |
| 7,481,403 B2 | * | 1/2009 | Yuan | 248/125.1 |
| 7,499,272 B2 | * | 3/2009 | Searby et al. | 248/917 |
| 2005/0236533 A1 | | 10/2005 | McRight et al. | |
| 2006/0087128 A1 | * | 4/2006 | Salice | 292/163 |
| 2008/0035812 A1 | * | 2/2008 | Lin | 248/220.21 |

* cited by examiner

*Primary Examiner*—A. Joseph Wujciak, III

(57) ABSTRACT

A supporting device for supporting a main component and an electronic apparatus using the same are provided. The supporting device comprises a holder, a connecting unit and an engaging unit. The holder is placed on a surface. The connecting unit is disposed immovably on the holder. The engaging unit is disposed immovably on the main component and able to be lodged in or separated from the connecting unit, so that the main component is lodged in or separated from the holder. The engaging unit comprises an actuator and a movable lock. The actuator is able to move the movable lock, so that the movable lock is lodged in or separated from the connecting unit. The movable lock comprises a restricting unit for restricting the movement of the actuator.

21 Claims, 5 Drawing Sheets

SUPPORTING DEVICE AND ELECTRONIC APPARATUS USING THE SAME

BACKGROUND OF THE INVENTION

1. Field of the Invention

The invention relates in general to a supporting device and an electronic apparatus using the same, and more particularly to a supporting device for supporting a main component on a surface and an electronic apparatus using the same.

2. Description of the Related Art

Many different kinds of electronic apparatuses are placed on a table or the ground for a user to operate. Please referring to FIG. 1, a conventional electronic apparatus 500 is illustrated in FIG. 1. The conventional stand-type electronic apparatus 500 includes a main component 600 and a supporting device 700. The supporting device 700 is for supporting the main component 600 to stand on a table or the ground.

As shown in FIG. 1, the main component 600 and the supporting device 700 of the electronic apparatus 500 occupy large space. The main component 600 is locked in or lodged in the supporting device 700 by the manufacturer. After the main component 600 and the supporting device 700 are assembled together, the volume of the electronic apparatus 500 is even larger. Therefore, the storage and shipping cost is increased significantly. Also, it is very inconvenient for a user to move the electronic apparatus himself/herself.

SUMMARY OF THE INVENTION

The invention is directed to a supporting device and an electronic apparatus using the same. A connecting unit is lodged in or separated from an engaging unit, so that a main component of the electronic apparatus is lodged in or separated from a holder.

According to the present invention, a supporting device for supporting a main component is provided. The supporting device includes a holder, a connecting unit and an engaging unit. The holder is placed on a surface. The connecting unit is disposed immovably on the holder. The engaging unit is disposed immovable on the main component and able to be lodged in or separated from the connecting unit, so that the main component is lodged in or separated from the holder. The engaging unit includes an actuator and a movable lock. The actuator is able to move the movable lock, so that the movable lock is lodged in or separated from the connecting unit. The movable lock includes a restricting unit for restricting the movement of the actuator.

According to the present invention, an electronic apparatus including a main component and a supporting device is provided. The supporting device is for supporting the main component. The supporting device includes a holder, a connecting unit and an engaging unit. The holder is placed on a surface. The connecting unit is disposed immovably on the holder. The engaging unit is disposed immovable on the main component and able to be lodged in or separated from the connecting unit, so that the main component is lodged in or separated from the holder. The engaging unit includes an actuator and a movable lock. The actuator is able to move the movable lock, so that the movable lock is lodged in or separated from the connecting unit. The movable lock includes a restricting unit for restricting the movement of the actuator.

The invention will become apparent from the following detailed description of the preferred but non-limiting embodiments. The following description is made with reference to the accompanying drawings.

DETAILED DESCRIPTION OF THE INVENTION

Figure 1:
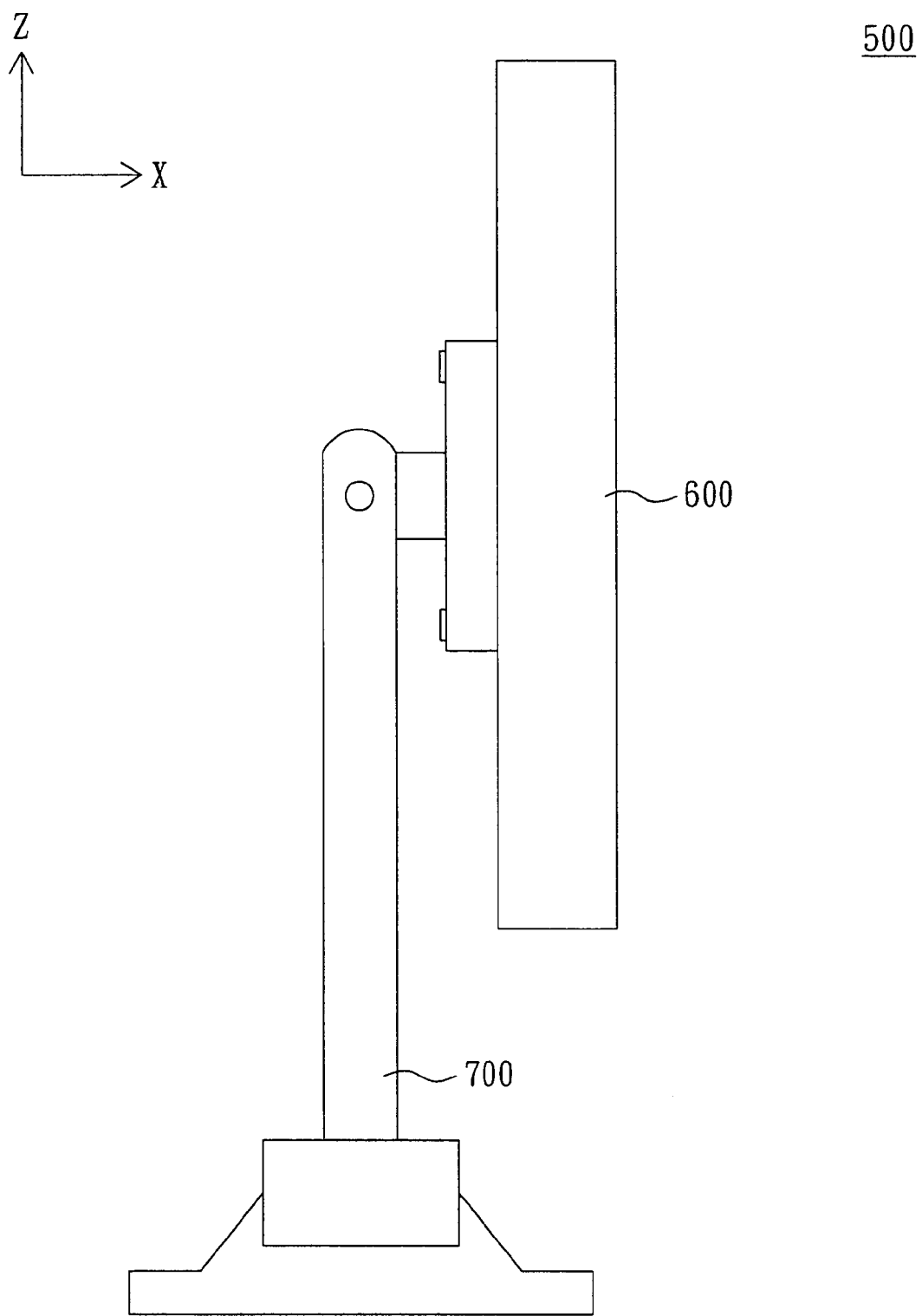
FIG. 1 (Prior Art) illustrates a conventional electronic apparatus.
Figure 2A:
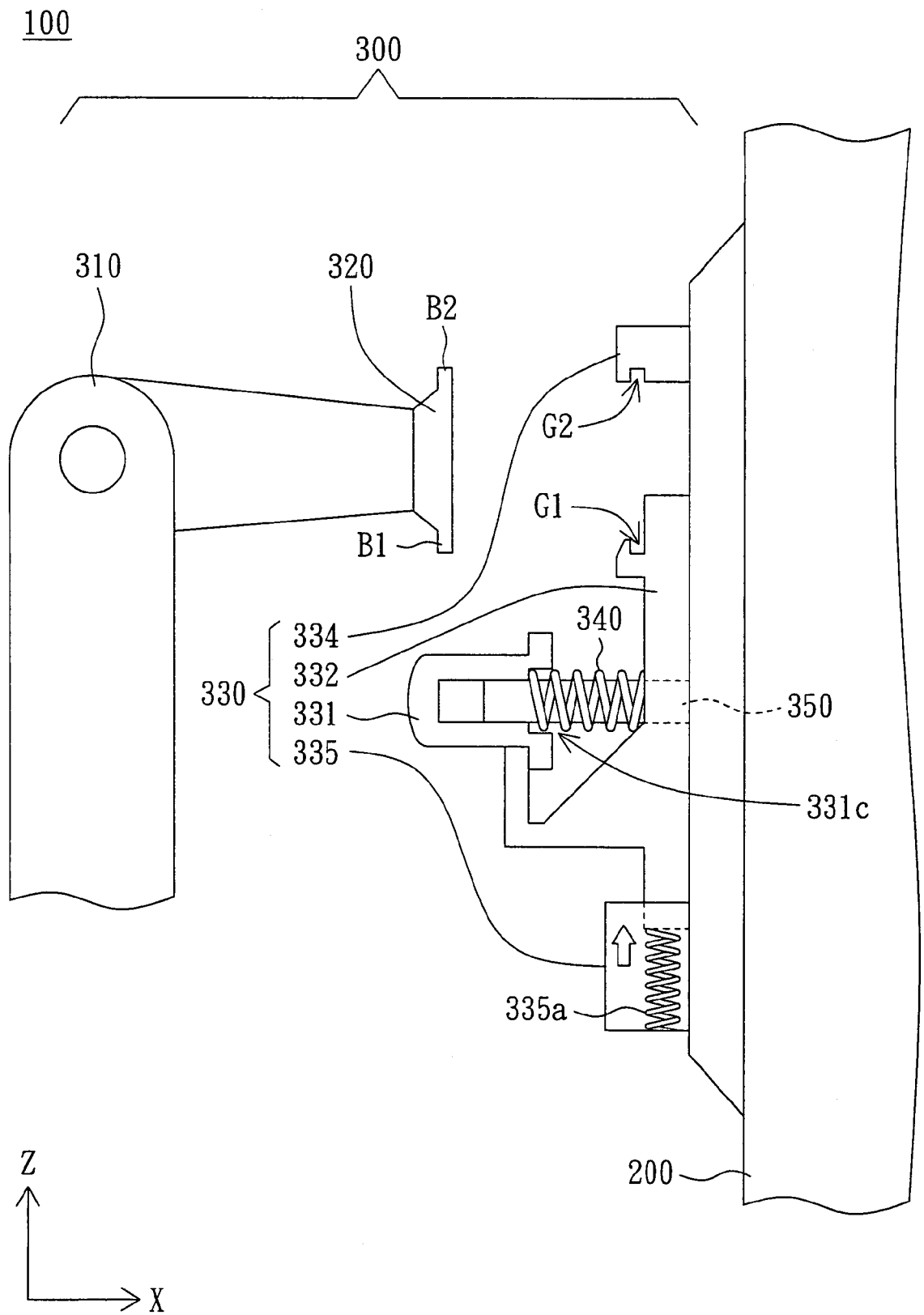
FIGS. 2A~2C illustrate an electronic apparatus according to a preferred embodiment of the present invention.
Figure 2B:
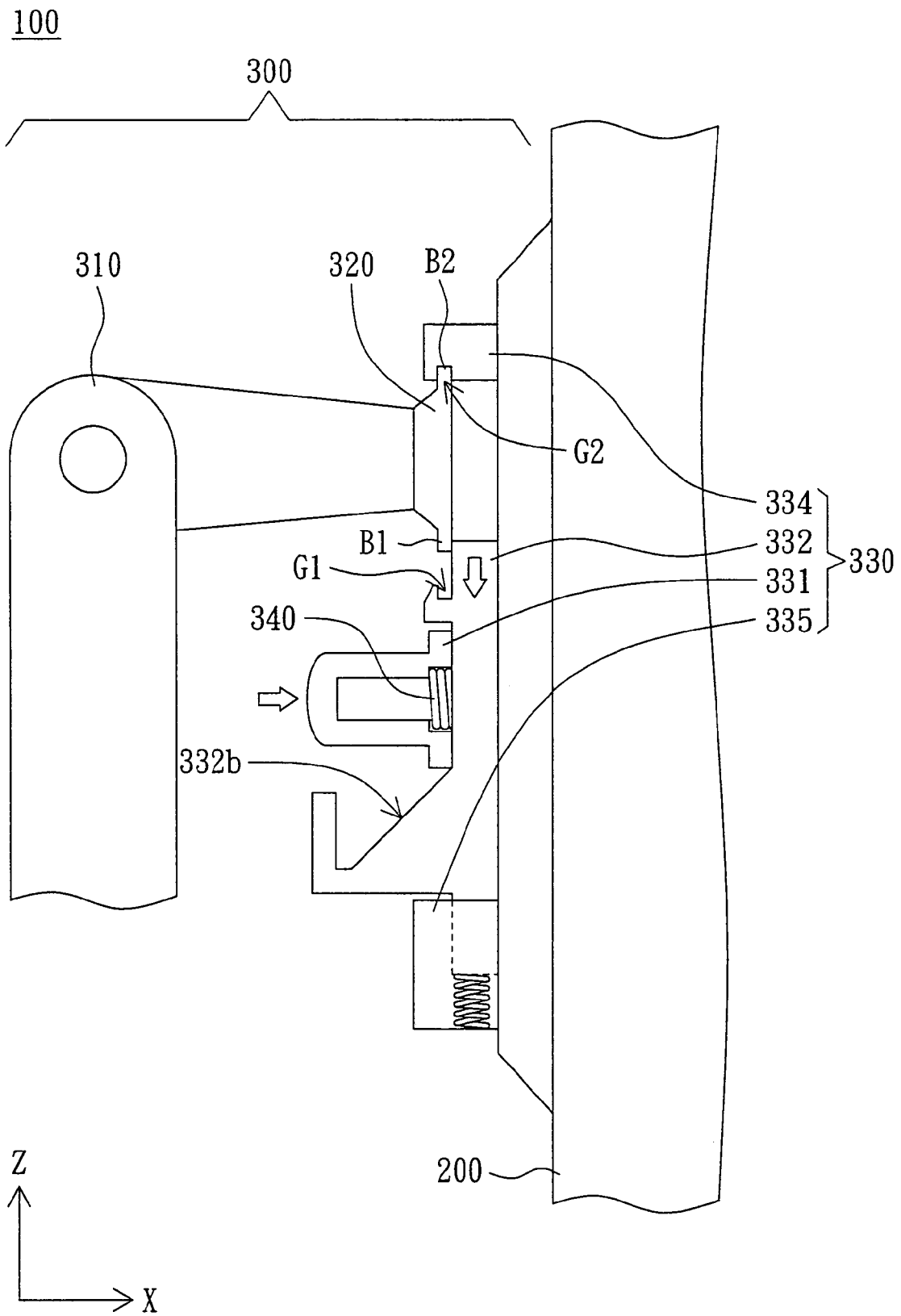
Figure 2C:
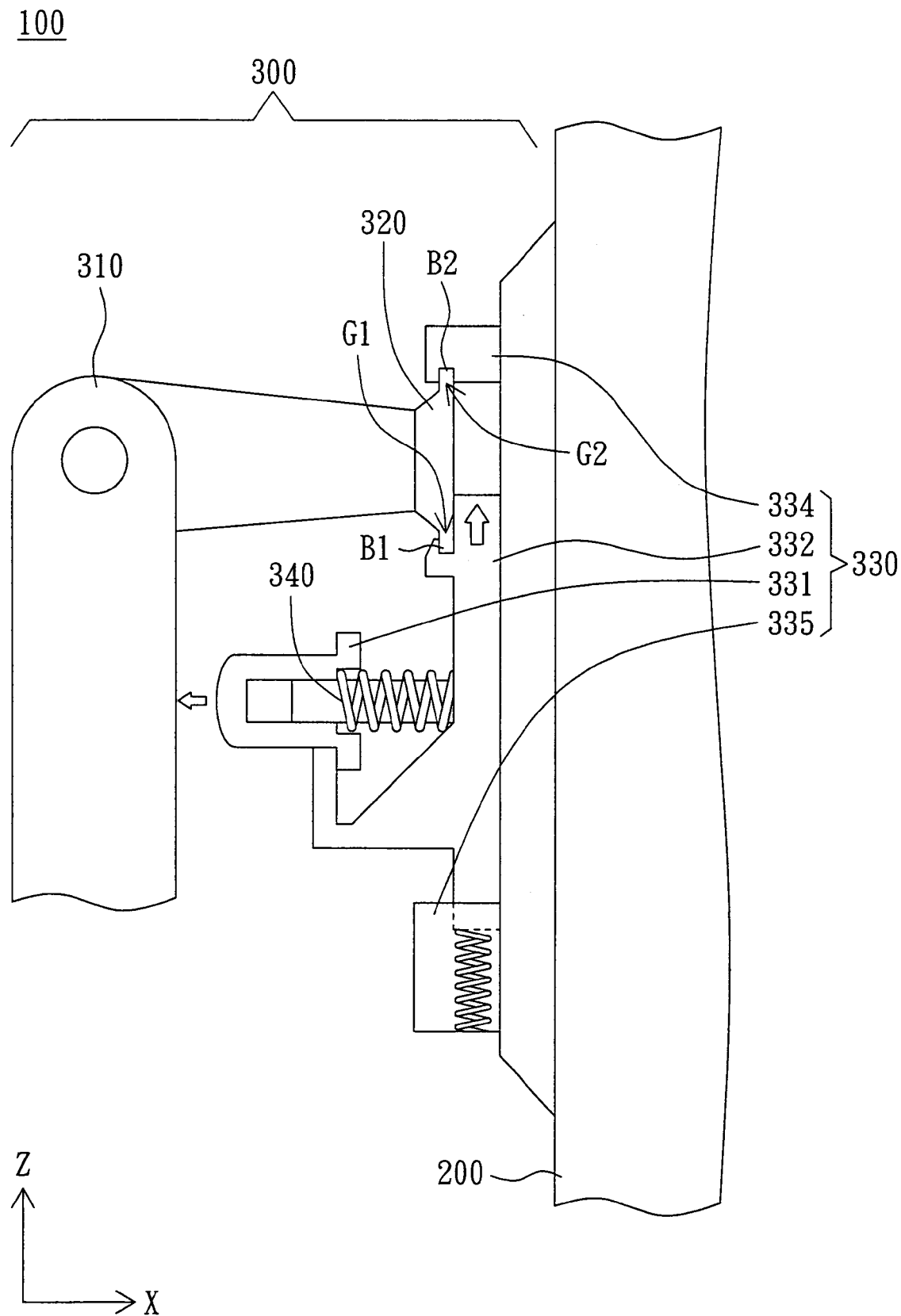

Please referring to FIGS. 2A~2C, an electronic apparatus according to a preferred embodiment of the present invention is illustrated in FIGS. 2A~2C. A supporting device 300 is for supporting a main component 200 on a surface, such as a table surface. In the present embodiment, the main component 200 is a display module as an example. The supporting device 300 includes a holder 310, a connecting unit 320 and an engaging unit 330. The holder 310 is placed on the surface, such as a table surface or the ground. The connecting unit 320 is disposed immovably on the holder 310. The engaging unit 330 is disposed immovably on the main component 200. As shown in FIG. 2A, the engaging unit 330 is able to be separated from the connecting unit 320, so that the main component 200 is separated from the holder 310. As shown in FIG. 2C, the engaging unit 330 is able to be lodged in the connecting unit 320, so that the main component 200 is lodged in the holder 310.

More specifically, the engaging unit 330 includes an actuator 331 and a movable lock 332. The actuator 331 is able to move the movable lock 332 upward and downward, so that the movable lock 332 is lodged in or separated from the connecting unit 320.

Figure 3:
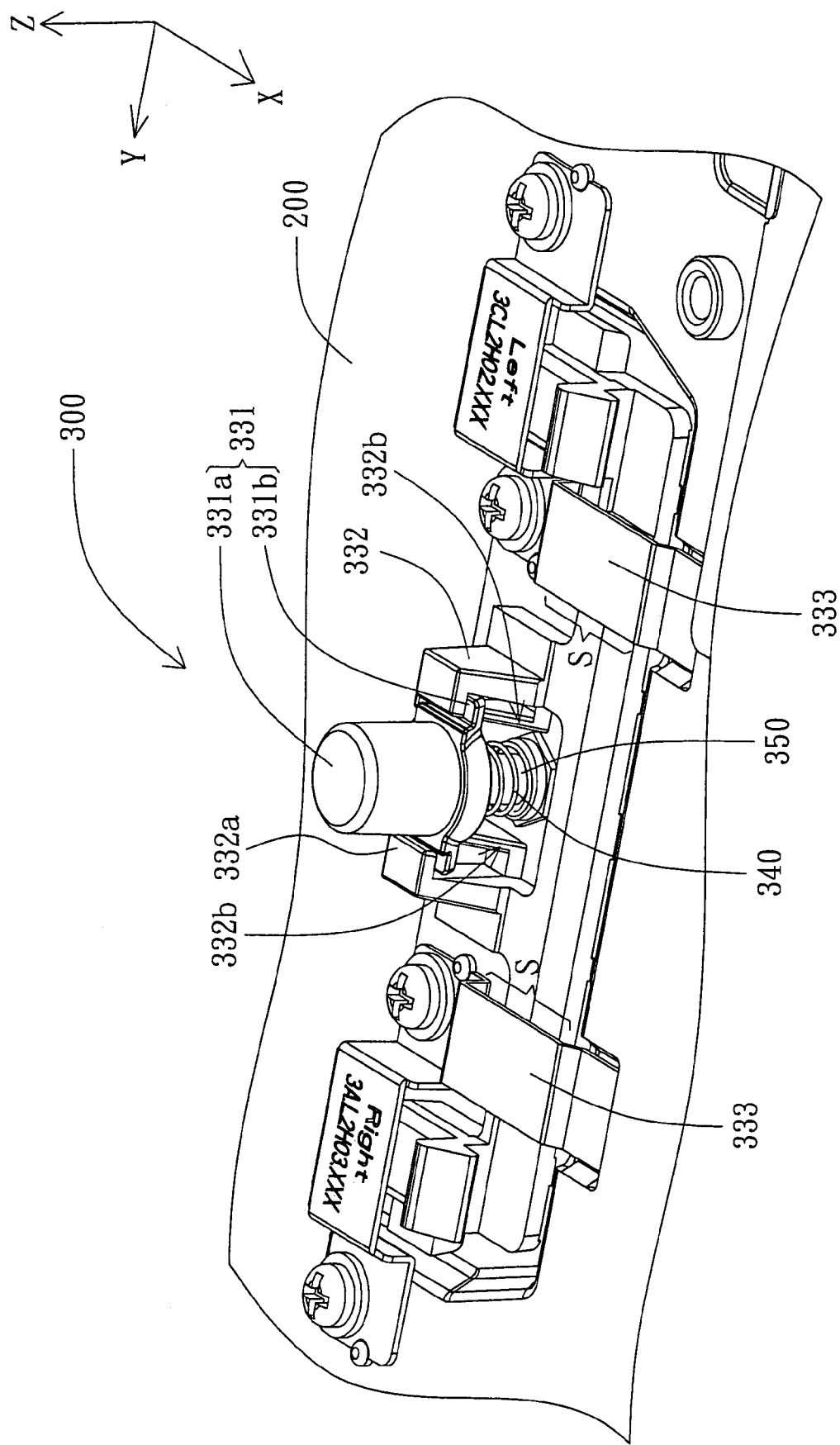
FIG. 3 is a three-dimensional view of a movable lock and an actuator.

Please referring to FIG. 3, FIG. 3 is a three-dimensional view of the movable lock 332 and the actuator 331. The movable lock 332 of the present embodiment includes a restricting unit 332a for restricting the movement of the actuator 331. The actuator 331 includes a main body 331a and a protruding part 331b. The protruding part 331b is disposed on a bottom of the main body 331a and has a ladder structure. The ladder structure is for leaning against the restricting unit 332a. The restricting unit 332a and the protruding part 331b cooperate together so that the actuator 331 does not fall off easily during the moving or assembling process.

Also, the restricting unit 332a and the protruding part 331b of the present embodiment are plate structures. The flat restricting unit 332a and protruding part 331b cooperate together so that the actuator 331 has better stability.

As shown in FIG. 2A, preferably the engaging unit 330 further includes, an immovable lock 334 and a sleeve 335. The immovable lock 334 and the sleeve 335 are disposed immovably on the main component 200. The immovable lock 334 is located above the movable lock 332. The sleeve 335 is located under the movable lock 332. The lower part of the movable lock 332 is inserted in the sleeve 335. A spring 335a is inside the sleeve 335 and provides the movable lock 332 with an upward elastic force, so that the movable lock 332 remains in an "upper position."

The movable lock 332 has a first engaging recess G1, and the immovable lock 334 has a second engaging recess G2. The connecting unit 320 further includes a first bump B1 and a second bump B2. The first bump B1 is corresponding to the first engaging recess G1, and the second bump B2 is corresponding to the second engaging recess G2.

As shown in FIG. 2B, the movable lock 332 has an inclined surface 332b, and the actuator 331 leans against the inclined surface 332b. When the actuator 331 moves along the inclined surface 332b, the actuator 331 pushes the movable lock 332 to move downward to a "lower position". As a result, the distance between the immovable lock 334 and the movable lock 332 is increased. Meanwhile, the connecting unit 320 is able to be placed between the immovable lock 334 and the movable lock 332.

As shown in FIG. 2C, after the actuator 331 is released, the movable lock 332 moves back to the "upper position" through the upward elastic force provided by the spring 335a. As a result, the movable lock 332 is lodged in the connecting unit 320.

As stated above, when the movable lock 332 moves close to the connecting unit 320, the first bump B1 is lodged in the first engaging recess G1, so that the connecting unit 320 is lodged in the engaging unit 330. When the movable lock 332 moves away from the connecting unit 320, the first bump B1 is separated from the first engaging recess G1, so that the connecting unit 320 is separated from the engaging unit 330.

Please referring to FIG. 2A, the supporting device 300 further includes an elastic unit 340 and a column 350. In the present embodiment, the elastic unit 340 is a spring surrounding the column 350. The elastic unit 340 is disposed between the main component 200 and the actuator 331. The actuator 331 moves back and forth along the X-axis direction through the elastic unit 340.

As shown in FIG. 3, although the elastic unit 340 provides the actuator 331 with an outward elastic force, the restricting unit 332a restricts the movement of the actuator 331 along the X-axis direction. Accordingly, no matter how the actuator 331 moves, the restricting unit 332a prevents the actuator 331 from falling off.

As shown in FIG. 2A, the actuator 331 has a recess 331c. The cross-sectional area of the recess 331c is slightly larger than that of the elastic unit 340. One end of the elastic unit 340 is disposed inside the recess 331c, so that the elastic unit 340 contacts the bottom of the recess 331c flatly and stably.

Please referring to FIG. 3, the engaging unit 330 further includes at least a leaning unit 333. In the present embodiment, the engaging unit 330 includes two leaning units 333. The leaning units 333 cover the movable lock 332 and are locked on the main component 200 for restricting the movable lock 332 to move along the surface of the main component 200 only. There is a moving space S between the leaning units 333 and the main component 200. The movable lock 332 is able to move within the moving space S. Because the movable lock 332 only moves along the surface of the main component 200, the stability of the movable lock 332 during the moving process is increased greatly.

In the supporting device and the electronic apparatus using the same according to the above embodiment of the present invention, the main component is able to be lodged in or separated from the holder. The supporting device includes several advantages, wherein some of the advantages are illustrated as follow.

1. The user only needs to press the actuator to assemble or disassemble the holder and the main component. Especially after the electronic apparatus leaves the factory, it is very convenient for an end-user to assemble or dissemble the holder and the main component himself/herself.

2. After the holder and the main component of the electronic apparatus are disassembled, the volume of the electronic apparatus is reduced greatly. The storage and shipping cost is decreased effectively.

3. The restricting unit of the movable lock and the protruding part of the actuator cooperate together so that the actuator does not fall off easily during the moving or assembling process. The restricting unit and the protruding part are plate structures preferably, so that the actuator moves more stably.

4. The recess of the actuator contains part of the elastic unit. The elastic unit contacts the bottom of the recess flatly and stably, so that the stability of the actuator and the elastic unit is increased.

5. Because the restricting unit restricts the movement of the movable lock, the movable lock moves along the surface of the main component only. Therefore, the movable lock moves more stably during the moving process.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A supporting device for supporting a main component of an electronic apparatus, the supporting device comprising:
   a holder placed on a surface;
   a connecting unit disposed immovably on the holder; and
   an engaging unit disposed immovably on the main component, so that the main component is lodged in or separated from the holder, the engaging unit comprising:
      an actuator; and
      a movable lock, the actuator able to move the movable lock, so that the movable lock is lodged in or separated from the connecting unit, the movable lock comprising a restricting unit for restricting the movement of the actuator;
   wherein the movable lock has an inclined surface, a bottom surface of the actuator leaning and sliding against the inclined surface for pushing the movable lock to move.

2. The device according to claim 1, further comprising:
   an elastic unit disposed between the main component and the actuator, the actuator moving back and forth along a direction through the elastic unit.

3. The device according to claim 2, wherein the restricting unit restricts the movement of the actuator along the direction.

4. The device according to claim 2, wherein the actuator has a recess for containing part of the elastic unit.

5. The device according to claim 1, wherein the actuator comprises:
   a main body; and
   a protruding part disposed on a bottom of the main body for leaning against the restricting unit.

6. The device according to claim 5, wherein the protruding part comprises a ladder structure for leaning against the restricting unit.

7. The device according to claim 1, wherein the engaging unit further comprises:
   a leaning unit covering the movable lock and locked on the main component for restricting the movable lock to move along the surface of the main component only.

8. The device according to claim 7, wherein there is a moving space between the leaning unit and the main component, the movable lock able to move within the moving space.

9. The device according to claim 1, wherein the movable lock has a first engaging recess, the connecting unit further comprising:
   a first bump corresponding to the first engaging recess;
   when the movable lock moves close to the connecting unit, the first bump is lodged in the first engaging recess, so that the connecting unit is lodged in the engaging unit;

when the movable lock moves away from the connecting unit, the first bump is separated from the first engaging recess, so that the connecting unit is separated from the engaging unit.

10. The device according to claim 1, wherein the connecting unit further comprises a second bump, the engaging unit further comprising:
   an immovable lock disposed immovably on the main component, the immovable lock has a second engaging recess for lodging in the second bump.

11. An electronic apparatus for detaching connecting to a supporting device, comprising:
   a main component; and
   a supporting device for supporting the main component, the supporting device comprising:
      a holder placed on a surface;
      a connecting unit disposed immovably on the holder; and
      an engaging unit disposed immovably on the main component, so that the main component is lodged in or separated from the holder, the engaging unit comprising:
         an actuator; and
         a movable lock, the actuator able to move the movable lock, so that the movable lock is lodged in or separated from the connecting unit, the movable lock comprising a restricting unit for restricting the movement of the actuator;
      wherein the movable lock has an inclined surface, a bottom surface of the actuator leaning and sliding against the inclined surface for pushing the movable lock to move.

12. The apparatus according to claim 11, wherein the supporting device comprises:
   an elastic unit disposed between the main component and the actuator, the actuator moving back and forth along a direction through the elastic unit.

13. The apparatus according to claim 12, wherein the restricting unit restricts the movement of the actuator along the direction.

14. The apparatus according to claim 12, wherein the actuator has a recess for containing part of the elastic unit.

15. The apparatus according to claim 11, wherein the actuator comprises:
   a main body; and
   a protruding part disposed on a bottom of the main body for leaning against the restricting unit.

16. The apparatus according to claim 11, wherein the movable lock has a first engaging recess, the connecting unit including a first bump corresponding to the first engaging recess, wherein when the movable lock moves close to the connecting unit, the first bump is lodged in the first engaging recess, so that the connecting unit is lodged in the engaging unit; and when the movable lock moves away from the connecting unit, the first bump is separated from the first engaging recess, so that the connecting unit is separated from the engaging unit.

17. The apparatus according to claim 11, wherein the connecting unit further comprises a second bump, the engaging unit further comprising:
   an immovable lock disposed immovably on the main component, the immovable lock has a second engaging recess for lodging in the second bump.

18. An electronic apparatus, comprising:
   a main component; and
   a supporting device for supporting the main component, the supporting device comprising:
      a holder placed on a surface,
      a connecting unit disposed immovably on the holder, and
      an engaging unit disposed immovably on the main component, so that the main component is lodged in or separated from the holder, the engaging unit including
         an actuator, movable in a first direction, and
         a movable lock, wherein when the actuator moves along the first direction in a state that the main component is lodged in the holder, the movable lock moves in a second direction, so that the movable lock is separated from the connecting unit, the movable lock comprising a restricting unit for restricting the movement of the actuator.

19. The electronic apparatus according to claim 18, wherein the supporting device further comprises an elastic unit disposed between the main component and the actuator to move, the actuator moving back and forth along the first direction through the elastic unit.

20. The electronic apparatus according to claim 18, wherein the supporting device further comprises a spring disposed inside the sleeve, the movable lock moving back and forth along the second direction through the spring.

21. The electronic apparatus according to claim 18, wherein the actuator comprises a main body, and a protruding part disposed on a bottom of the main body for leaning against the restricting unit.

* * * * *